(12) United States Patent
Pusdesris et al.

(10) Patent No.: US 9,880,843 B2
(45) Date of Patent: Jan. 30, 2018

(54) DATA PROCESSING APPARATUS AND METHOD FOR DECODING PROGRAM INSTRUCTIONS IN ORDER TO GENERATE CONTROL SIGNALS FOR PROCESSING CIRCUITRY OF THE DATA PROCESSING APPARATUS

(75) Inventors: Joseph M Pusdesris, Ann Arbor, MI (US); Trevor N Mudge, Ann Arbor, MI (US); Thomas D Manville, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1516 days.

(21) Appl. No.: 13/363,606

(22) Filed: Feb. 1, 2012

(65) Prior Publication Data

US 2013/0198487 A1    Aug. 1, 2013

(51) Int. Cl.
| | | |
|---|---|---|
| G06F 9/30 | (2006.01) | |
| G06F 9/34 | (2006.01) | |
| G06F 9/35 | (2006.01) | |
| G06F 9/355 | (2006.01) | |
| G06F 9/345 | (2006.01) | |

(52) U.S. Cl.
CPC .......... *G06F 9/3012* (2013.01); *G06F 9/3016* (2013.01); *G06F 9/30098* (2013.01); *G06F 9/34* (2013.01); *G06F 9/342* (2013.01); *G06F 9/345* (2013.01); *G06F 9/3552* (2013.01)

(58) Field of Classification Search
CPC . G06F 9/34; G06F 9/342; G06F 9/345; G06F 9/3552; G06F 9/3016
USPC ........................................................ 712/208
See application file for complete search history.

(56) References Cited

U.S. PATENT DOCUMENTS

| | | | | |
|---|---|---|---|---|
| 5,857,103 A | * | 1/1999 | Grove | 717/158 |
| 5,991,870 A | * | 11/1999 | Koumura et al. | 712/208 |
| 6,081,880 A | * | 6/2000 | Sollars | 711/202 |
| 6,651,160 B1 | * | 11/2003 | Hays | 712/210 |
| 2008/0215856 A1 | * | 9/2008 | Gschwind et al. | 712/220 |
| 2011/0283090 A1 | * | 11/2011 | Mejdrich et al. | 712/220 |

(Continued)

OTHER PUBLICATIONS

Yeager et al., "The Mips R10000 superscalar microprocessor", Apr 1996, Micro, IEEE, vol. 16, Issue 2, pp. 28-41.*

(Continued)

*Primary Examiner* — Yuqing Xiao
(74) *Attorney, Agent, or Firm* — Nixon & Vanderhye P.C.

(57) ABSTRACT

A data processing apparatus and method for accessing operands stored within a set of registers. Instruction decoder circuitry, responsive to program instructions, generates register access control signals identifying for each program instruction which registers in the register set are to be accessed by the processing circuitry when performing the processing operation specified by that program instruction. The set of registers are logically arranged as a plurality of register groups, with each register in the set being a member of more than one register group. Each program instruction includes a register specifier field, and instruction decoder circuitry is responsive to each program instruction to determine a selected register group, and to determine one or more selected members of that selected register group. The instruction decoder circuitry then outputs register access control signals identifying the register corresponding to each selected member of the selected register group.

12 Claims, 9 Drawing Sheets

(56) References Cited

U.S. PATENT DOCUMENTS

2011/0296140 A1\* 12/2011 Chang et al. .................. 712/41
2012/0084535 A1\* 4/2012 Hickey et al. ................ 712/208
2013/0159676 A1\* 6/2013 Muff et al. ................... 712/208

OTHER PUBLICATIONS

IBM TDB, "A Technique for Adding Additional Registers to an Instruction Set Architechture", IPCOM000188078D, The IP.COM Journal, Sep. 22, 2009.\*

\* cited by examiner

|  | COLUMN DIMENSION | | | |
|---|---|---|---|---|
|  | GROUP | GROUP | GROUP | GROUP |
| GROUP | R0 | R1 | R2 | R3 |
| GROUP | R4 | R5 | R6 | R7 |
| GROUP | R8 | R9 | R10 | R11 |
| GROUP | R12 | R13 | R14 | R15 |

ROW DIMENSION

DATA PROCESSING APPARATUS AND METHOD FOR DECODING PROGRAM INSTRUCTIONS IN ORDER TO GENERATE CONTROL SIGNALS FOR PROCESSING CIRCUITRY OF THE DATA PROCESSING APPARATUS

BACKGROUND OF THE INVENTION

Field of the Invention

The present invention relates to a data processing apparatus and method for decoding program instructions in order to generate control signals for processing circuitry of the data processing apparatus.

Description of the Prior Art

Data processing circuitry will typically have access to a set of registers that are arranged to store operands for access by that data processing circuitry whilst it is performing data processing operations. The data processing operations that the data processing circuitry performs are typically defined by a series of instructions, where each instruction includes a register specifier field identifying the registers that are to form source and/or destination operands for the associated data processing operation.

However, the instructions of a particular instruction set are typically constrained to a certain number of bits, and hence it is important to use the bit encoding space of the instruction as efficiently as possible in order to enable the required information to be encoded within the instruction. With regard to the register specifier field, it is hence desirable wherever possible to reduce the number of bits required to specify the registers to be used as source and/or destination operands. By doing so, this will free up more space within the instruction to encode other information, and/or allow more registers to be specified within a particular number of bits.

One known approach for reducing the number of bits needed to encode the registers within the register specifier field of the instruction is often referred to as register renaming. In accordance with register renaming, there are a relatively small number of register identifiers that can be specified within the instruction. However, the processor itself has access to more physical registers than can be named directly in the instruction, and register rename hardware within the processor is used to rename registers in certain situations in order to achieve a higher degree of parallelism within the processor, and hence increase performance. However, such an approach is typically only used in high performance processors having multiple parallel execution paths, where the hardware overhead involved in performing register renaming is considered worthwhile for the performance benefits achieved. In addition, register renaming limits the ability of the compiler to take advantage of the actual physical registers available. Indeed, often the compiler must store operand values to memory because there are not enough architecturally visible registers for it to use within the program instructions.

Another known technique for reducing the number of bits required in the instruction space to identify registers is referred to as register windowing. In accordance with a typical register windowing technique, several sets of registers are provided for different programs, or different parts of a program. The instructions themselves specify registers within a predetermined range, but the processor recognises the movement from one part of the program to another, or from one program to another, for example through the monitoring of procedure calls. The state of the hardware is then updated as appropriate so as to cause the register specified by an instruction to be mapped to the actual window of registers applicable for the current context. However, such an approach lacks flexibility when seeking to perform operations on values from multiple contexts due to the different register windows associated with each context, and typically requires special instructions to change the context and accordingly change the mapping between the registers specified in the instruction and the actual physical registers accessed.

Accordingly, it would be desirable to provide an improved mechanism for efficiently encoding registers within instructions.

SUMMARY OF THE INVENTION

Viewed from a first aspect, the present invention provides a data processing apparatus comprising: processing circuitry configured to perform processing operations; a set of registers configured to store operands for access by the processing circuitry during performance of said processing operations; instruction decoder circuitry coupled to said processing circuitry and responsive to program instructions to generate control signals for the processing circuitry, said control signals including register access control signals identifying for each program instruction which registers in the set of registers are to be accessed by the processing circuitry when performing the processing operation specified by that program instruction; the set of registers being logically arranged as a plurality of register groups, with each register in the set of registers being a member of more than one of said register groups; each program instruction including a register specifier field, and said instruction decoder circuitry being responsive to each program instruction: (i) to determine, from group identifying data within the register specifier field, a selected register group of said plurality of register groups; (ii) to determine, from member identifying data within the register specifier field, one or more selected members of said selected register group; and (iii) to output said register access control signals identifying the register corresponding to each selected member of the selected register group.

In accordance with the present invention, the set of registers are logically arranged as a plurality of register groups, with each register in the set of registers being a member of more than one register group. Each program instruction then includes within its register specifier field both group identifying data and member identifying data. The instruction decoder circuitry of the data processing apparatus uses the group identifying data in order to determine a selected register group. Further, the member identifying data is used by the instruction decoder circuitry to determine one or more selected members of the selected register group. Thereafter, the instruction decoder generates register access control signals identifying the register corresponding to each selected member of the selected register group.

Such an approach has been found to provide a particularly efficient encoding, allowing a wide range of registers to be specified by a compact encoding within the instruction.

In accordance with the present invention, the compiler is able to have visibility of all of the registers within the register set, but each individual instruction is constrained to specify registers within one of the register groups. Since each register is a member of more than one register group, this still provides flexibility as to how the registers are used.

As a result of the use of the present invention, it is possible to specify more registers within a specified number of bits of the instruction encoding space than would otherwise be possible, or alternatively to use less bits of the instruction encoding space to specify a particular number of registers than would be required using conventional techniques.

The instruction decoder circuitry can be arranged in a variety of ways. However, in one embodiment, the instruction decoder circuitry comprises mapping circuitry configured to determine, in dependence on the group identifying data, mapping data indicative of the selected register group, and register access control signal generation circuitry configured to generate, for each selected member determined from the member identifying data, a corresponding register access control signal identifying the register corresponding to that selected member. For each selected member, the register access control signal generation circuitry is configured to apply the mapping data to the corresponding item of member identifying data in order to generate the corresponding register access control signal. Hence, in accordance with this embodiment, the group identifying data is used to produce mapping data which is then used in combination with each item of member identifying data in order to generate the corresponding register access control signal. This provides a very efficient mechanism for generating the required register access control signals identifying the registers to be accessed.

The group identifying data can take a variety of forms. However, in one embodiment, the group identifying data comprises M group bits and a group type indicator. Each item of member identifying data then comprises N bits. In addition, each register access control signal comprises M+N bits, and the mapping data generated by the mapping circuitry identifies the M group bits and the location that those M group bits are to occupy within the bit space of the register access control signal. Hence, in such embodiments, the mapping data directly uses the M group bits, and identifies at which bit positions within the bit space of the register access control signal those M group bits are to be used, with the remaining bits then being formed from the N bits of the corresponding item of member identifying data. This provides a very simple and efficient mechanism for generating the register access control signals from each item of member identifying data, dependent on the group identifying data.

Whilst the physical registers in the register set may be physically provided in any appropriate form, and hence in one embodiment may have a flat mapped structure, in one embodiment the set of registers are logically arranged as a multi-dimensional matrix of registers. In such an embodiment, each register group can be arranged to contain as members those registers located along an associated path within the multi-dimensional matrix. By using such a multi-dimensional matrix logical arrangement, this provides an efficient mechanism for defining the various register groups.

The associated path for any particular register group may take a variety of routes through the matrix, and need not take a linear route, at least for some of the defined register groups. In addition, whilst the members are formed from registers located along the associated path, not all registers located along that path need to form members of the register group. Nevertheless, in one embodiment each register group does contain as members all registers located along the associated path.

In one embodiment, the associated path comprises a vector through the multi-dimensional matrix.

The multi-dimensional matrix may take a variety of forms. However, in one embodiment the multi-dimensional matrix is a two-dimensional (2D) matrix comprising a plurality of rows and a plurality of columns, and the group identifying data identifies as the selected register group a register group containing as members those registers located along one row or one column of the 2D matrix. In such an arrangement, it will be appreciated that each register is a member of two register groups, namely one register group associated with a row, and one register group associated with a column.

In an alternative embodiment, the multi-dimensional matrix is a three-dimensional (3D) matrix comprising a plurality of rows, a plurality of columns and a plurality of depth vectors, and the group identifying data identifies as the selected register group a register group containing as members those registers located along one row, one column or one depth vector of the 3D matrix. In such an embodiment, it will be appreciated that each register will be a member of three register groups, namely one register group associated with a row, one register group associated with a column, and one register group associated with a depth vector.

When encoding the group identifying data within the register specifier field for the 3D matrix embodiment, two bits of information will be required to identify whether the group is a group found within a row, a column, or a depth vector. However, it will be appreciated that there will also be one spare encoding within the two bits, given that four possible encodings of two bits exist. Accordingly, in one particular embodiment, the group identifying data may identify as the selected register group a register group containing as members those registers located along one row, one column, one depth vector or one other group path from a predetermined set of other group paths within the 3D matrix.

This predetermined set of other group paths can be determined as desired having regard to the particular implementation. However, in one particular embodiment the predetermined set of other group paths comprises a plurality of diagonal vectors through the 3D matrix.

Viewed from a second aspect, the present invention provides a method of operating an instruction decoder to decode program instructions in order to generate control signals for processing circuitry of a data processing apparatus, the processing circuitry performing processing operations and having access to a set of registers storing operands for access by the processing circuitry during performance of said processing operations, said control signals including register access control signals identifying for each program instruction which registers in the set of registers are to be accessed by the processing circuitry when performing the processing operation specified by that program instruction, the set of registers being logically arranged as a plurality of register groups, with each register in the set of registers being a member of more than one of said register groups, and the method comprising, in response to each program instruction: (i) determining, from group identifying data within a register specifier field of the program instruction, a selected register group of said plurality of register groups; (ii) determining, from member identifying data within the register specifier field, one or more selected members of said selected register group; and (iii) outputting said register access control signals identifying the register corresponding to each selected member of the selected register group.

Viewed from a third aspect, the present invention provides a computer program product storing in a non-transitory form a computer program for controlling a computer to provide a virtual machine execution environment for program instructions corresponding to a data processing apparatus in accordance with the first aspect of the present invention.

Viewed from a fourth aspect, the present invention provides a computer program product comprising a plurality of program instructions which, when executed on a computer, causes a decoding operation to be performed in response to each program instruction: (i) to determine, from group identifying data within a register specifier field of the program instruction, a selected register group from a plurality of register groups; (ii) to determine, from member identifying data within the register specifier field, one or more selected members of said selected register group; and (iii) to output to processing circuitry of the computer register access control signals identifying the register corresponding to each selected member of the selected register group.

Viewed from a fifth aspect, the present invention provides a data processing apparatus comprising: processing means for performing processing operations; a set of register means for storing operands for access by the processing means during performance of said processing operations; instruction decoder means for generating control signals for the processing means in response to program instructions, said control signals including register access control signals identifying for each program instruction which register means in the set of register means are to be accessed by the processing means when performing the processing operation specified by that program instruction; the set of register means being logically arranged as a plurality of register groups, with each register means in the set of register means being a member of more than one of said register groups; each program instruction including a register specifier field, and said instruction decoder means, responsive to each program instruction: (i) for determining, from group identifying data within the register specifier field, a selected register group of said plurality of register groups; (ii) for determining, from member identifying data within the register specifier field, one or more selected members of said selected register group; and (iii) for outputting said register access control signals identifying the register means corresponding to each selected member of the selected register group.

BRIEF DESCRIPTION OF THE DRAWINGS

The present invention will be described further, by way of example only, with reference to embodiments thereof as illustrated in the accompanying drawings, in which:

FIG. 4 illustrates how the set of registers may be logically arranged as a two dimensional matrix in accordance with one embodiment;

DESCRIPTION OF EMBODIMENTS

Figure 1:
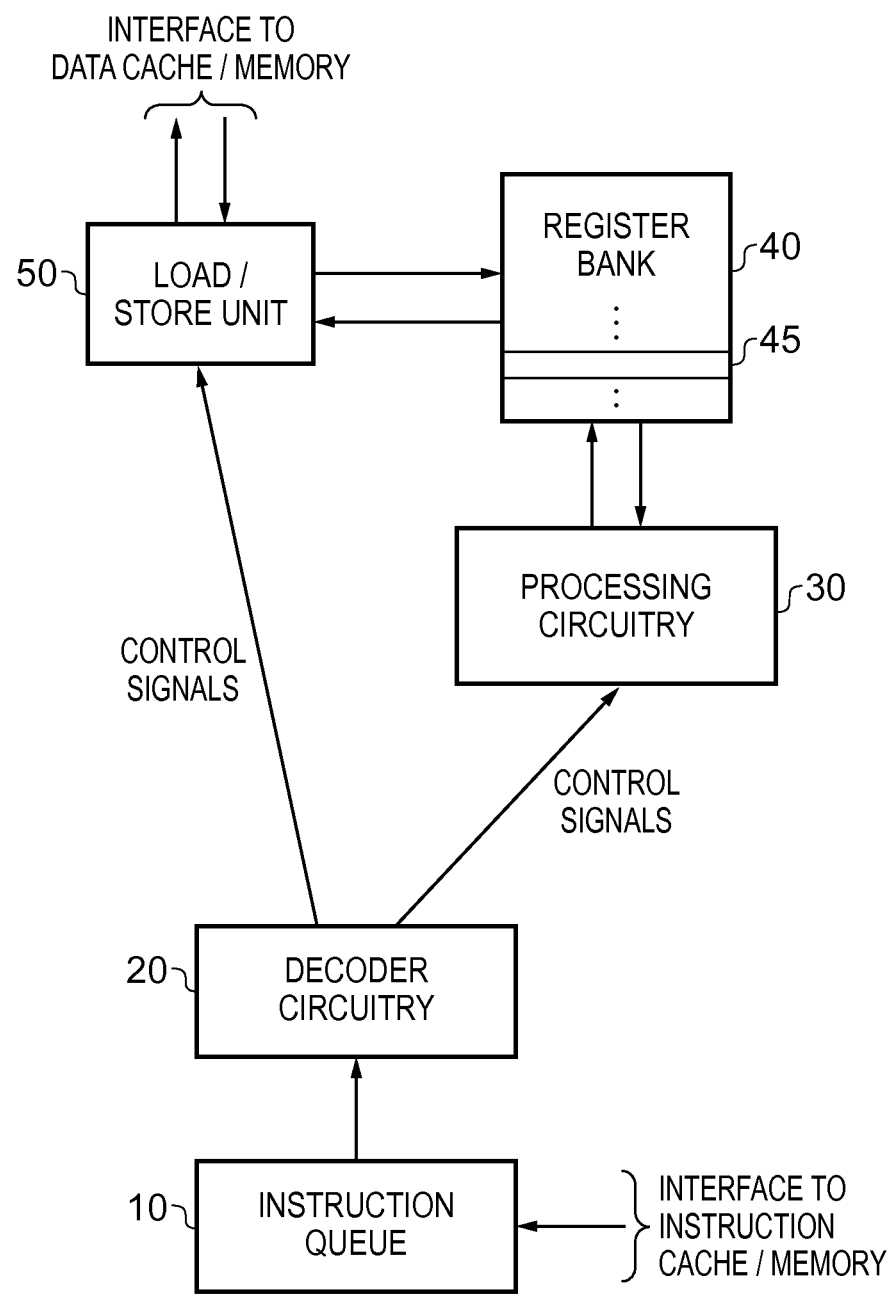
FIG. 1 is a block diagram of a data processing apparatus in accordance with one embodiment.

FIG. 1 is a block diagram of a data processing apparatus in accordance with one embodiment. In accordance with this embodiment, a stream of instructions are fetched from an instruction cache and/or memory, and placed in an instruction queue 10, from where the decoder circuitry 20 retrieves each instruction and decodes it in order to generate control signals sent to other components within the data processing apparatus. In particular, if the instruction is a load or store instruction used to load operand data from memory into the register bank 40, or to store operand data from the register bank back to memory, control signals will be sent to the load/store unit 50 in order to cause the required load or store operation to be performed. As will be understood by those skilled in the art, one or more levels of data cache may be provided between the load/store unit 50 and main memory, and accordingly data may be directly loaded in from one of the levels of the data cache into the register bank 40, or indeed stored from the register bank to one or more of those levels of data cache.

When an instruction specifies a data processing operation, for example an add operation, a subtract operation, a shift operation, etc, the control signals will be routed to the processing circuitry 30 to cause the required operations to be performed. Those control signals will also include register access control signals identifying which registers 45 in the register bank 40 contain source operands for the operation, and typically also identifying a register in which to store the destination operand produced as a result of the operation performed within the processing circuitry. Purely by way of example, it is often the case that an instruction will specify two source operand registers, and one destination operand register.

The register bank 40 will contain a plurality of registers 45, each of which can be used to store either a source operand or a destination operand. Further, it will be understood that a register that acts as a destination register for one operation may also act as a source register for another operation.

Figure 2:
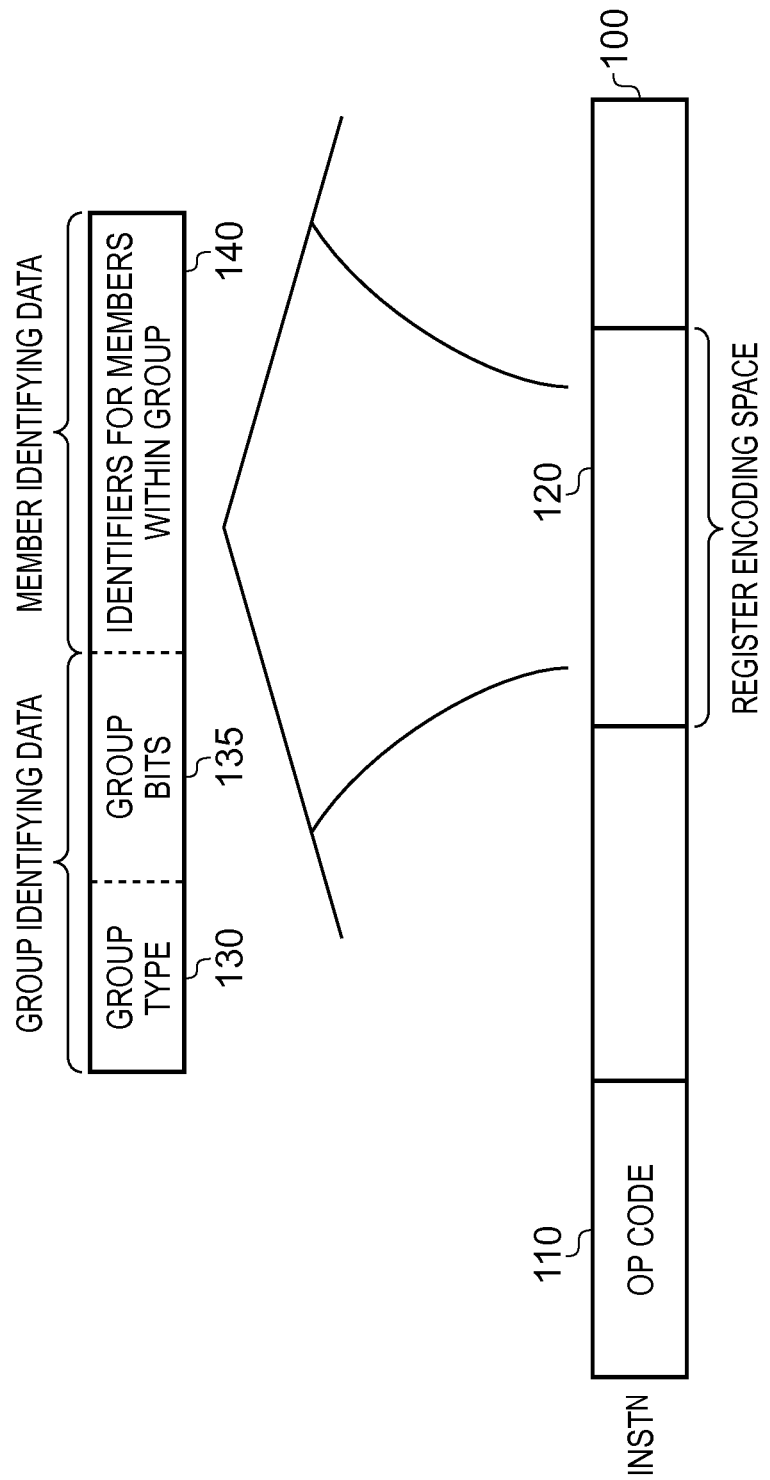
FIG. 2 schematically illustrates an instruction encoding space, and the contents of the register encoding space within the instruction in accordance with one embodiment.

The instruction encoding space provided for encoding all of the information associated with an instruction is a valuable commodity. For example, as shown in FIG. 2, the instruction encoding space 100 needs to encode a variety of pieces of information. For example, in addition to a set of bits 110 used to define the opcode (i.e. to identify what type of operation is to be performed), various other bits within the instruction encoding space 100 will be required to specify various other parameters of the instruction. Of significance to the present invention is the register encoding space 120, also referred to herein as the register specifier field. Within this register specifier field it is necessary to identify all of the registers to be used when the operation is performed, for example the two source operands and one destination operand of the earlier-mentioned example. The register specifier field can consume a significant portion of the available bit space within the instruction. For example, considering a 32-bit instruction, and an example where the register set contains 16 registers, it will be appreciated that if those registers are to be directly encoded within the instruction, it will be necessary to provide four bits for each register, and hence the register specifier field would consume 12 bits within the register encoding space. Clearly the amount of space required increases as the number of registers in the register bank increases, and accordingly it is highly desirable to provide a more bit efficient way of encoding the registers within the register specifier field, either to allow more registers to be specified within the equivalent number of bits, or to free up some of the instruction bit space for use to identify other parameters of the instruction.

FIG. 2 illustrates how the register specifier field 120 is arranged in accordance with one embodiment. In particular, whilst the physical registers may be arranged in any suitable way, such as in a flat mapped configuration, those set of registers are logically arranged as a plurality of register groups, with each register in the register set being a member of more than one of those groups. The register specifier field then includes group identifying data used by the instruction decoder to determine the selected register group from the plurality of register groups, and also includes member identifying data identifying one or more selected members from that selected register group. Using both of these pieces of information, the instruction decoding circuitry is then able to generate the register access control signals required to identify the register corresponding to each selected member of the selected register group.

As shown in FIG. 2, the group identifying data includes one or more bits used to specify a group type 130, along with a plurality of group bits 135 used to identify a particular group within a number of groups having the same group type. The member identifying data 140 then includes identifiers for the individual members within the group, and in one embodiment there are a plurality of items of member identifying data within the member identifying data field 140.

Figure 3:
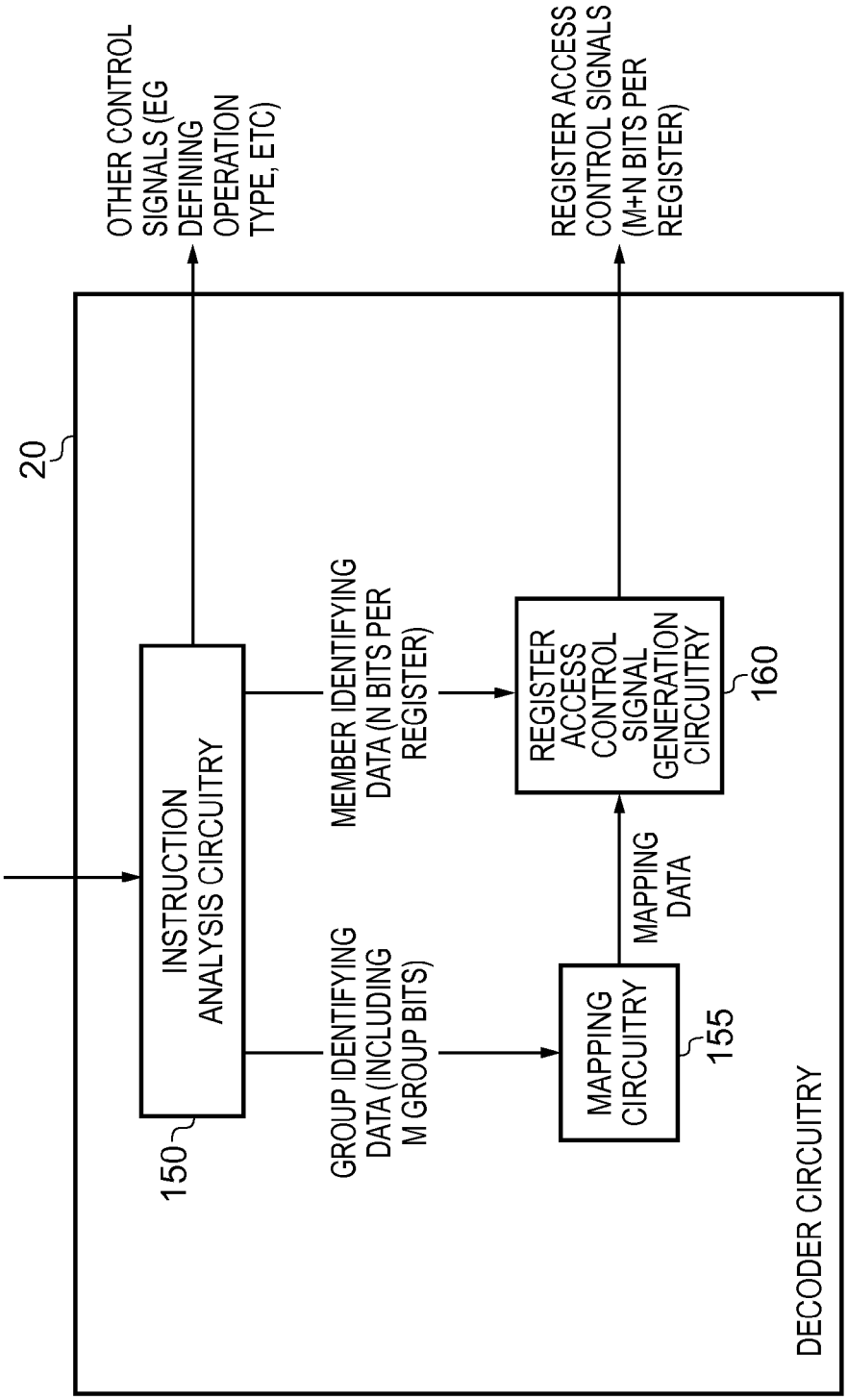
FIG. 3 is a block diagram illustrating in more detail the decoder circuitry of FIG. 1 in accordance with one embodiment.

FIG. 3 is a block diagram illustrating in more detail the decoder circuitry 20 of FIG. 1 in accordance with one embodiment. The decoder circuitry 20 includes instruction analysis circuitry 150 for performing a number of instruction decoding functions in order to identify the various fields within the instruction encoding 100, and to decode those fields in order to identify the type of operation required, etc. The group identifying data extracted from the register specifier field 120 is forwarded to mapping circuitry 155. The mapping circuitry is then arranged to generate mapping data which is forwarded to register access control signal generation circuitry 160. In one embodiment, the mapping circuitry takes the group bits 135 (in this example there being M group bits) and, based on the group type data 130, determines which bit positions within the register access control signal those M group bits should occupy. This mapping data is then forwarded to the register access control signal generation circuitry 160, which then uses the M group bits in the way defined by the mapping data, and fills in the blank bits in the register access control signal space using the member identifying data forwarded on from the instruction analysis circuitry 150. In this example, each register access control signal comprises M+N bits, and the N bits required are taken from the corresponding item of member identifying data (the member identifying data comprising N bits per item (i.e. per register)).

There are a number of ways in which the register set can be logically arranged in a plurality of register groups. However, in one embodiment the register set is logically arranged as a multi-dimensional matrix of registers, and each register group contains as members those registers located along an associated path within the multi-dimensional matrix.

FIG. 4 illustrates one example where the registers are arranged in a two dimensional (2D) matrix. In this example, it is assumed that the register set comprises 16 registers (R0 to R15) and FIG. 4 illustrates one specific way in which those registers may be distributed within the 2D matrix 200. As will be appreciated from FIG. 4, it is possible to define eight groups within that matrix, four associated with the row dimension, and four associated with the column dimension.

Figure 5:
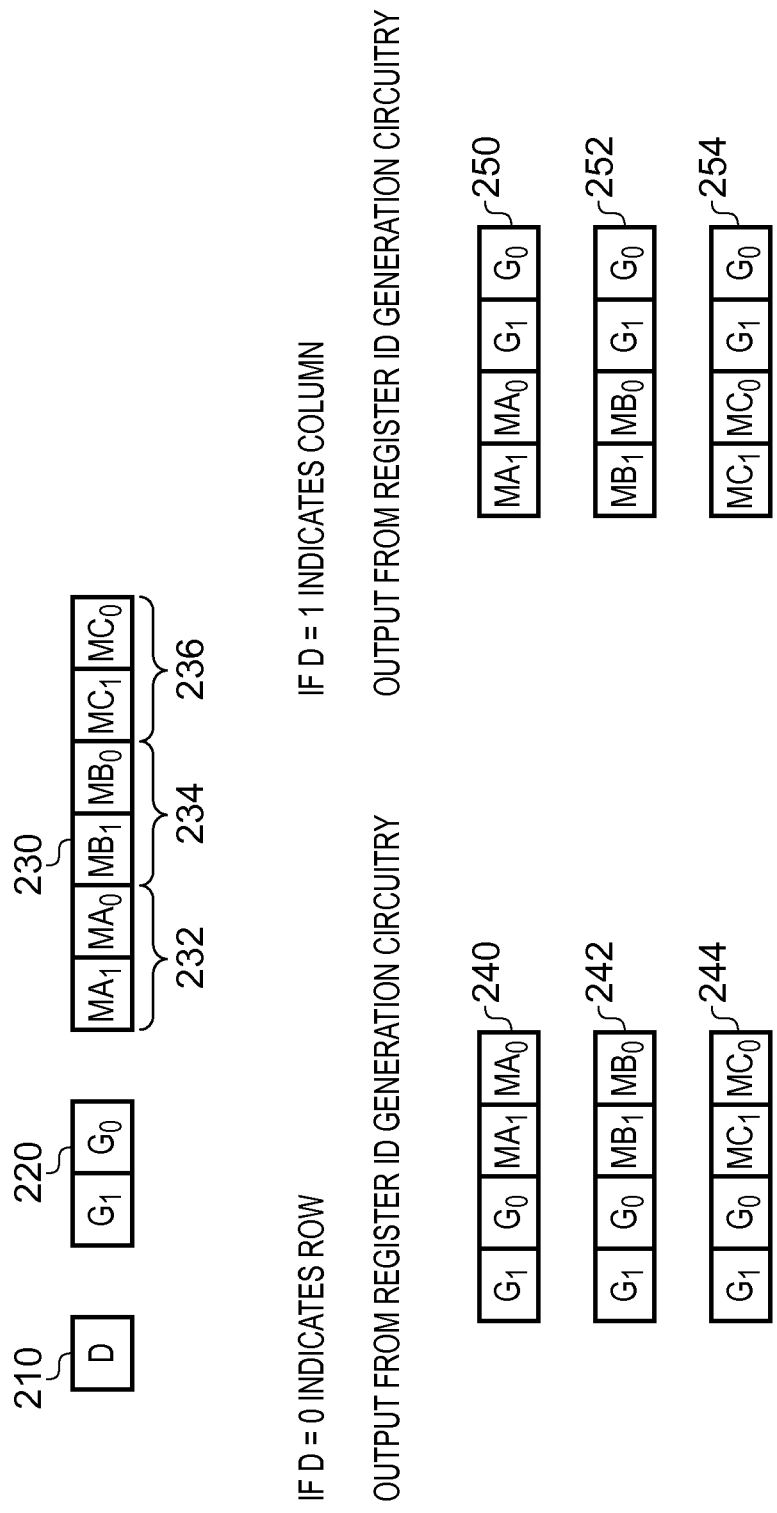
FIG. 5 illustrates how the contents of the register encoding space of an instruction are used to generate register access control signals for each register to be accessed, when the set of registers are logically arranged as a two dimensional matrix in accordance with one embodiment.

FIG. 5 illustrates how the register encoding space can be used to enable the required register access control signals to be generated by the decoder circuitry 20. In this case, the group type 130 of FIG. 2 comprises a single dimension bit 210 used to identify whether the group is to be found within a row or within a column. The group bits 135 are then formed by two bits 220 used to identify which group within the particular dimension is to be used. The two source operands and one destination operand are then specified by three items 232, 234, 236 of 2-bit member identifying data within the member identifying data space 230.

FIG. 5 shows how the mapping data is formed dependent on whether the group exists within a row, or within a column. In particular, if the group exists within a row, then the group data bits 220 are used to form the most significant two bits of the 4-bit register access control signal, with the least significant two bits then being formed from each item of member identifying data. Accordingly, the three register identifier signals 240, 242, 244, will be generated. However, if a group within a column is specified, then the two group bits 220 form the least significant two bits of the register access control signal, with each item of member identifying data then forming the upper two bits. As a result, the three register access control signals 250, 252, 254 are produced.

As will be apparent from FIG. 5, a total of 9 bits are required within the register encoding space 120 to encode the three registers, rather than the 12 bits that would have been required if those registers had been directly encoded within the register encoding space 120. Hence, by restricting the operands for any particular instruction to be selected from within a particular group of the 2D matrix, a significant reduction in the number of bits required within the register encoding space can be realised.

Figure 6:
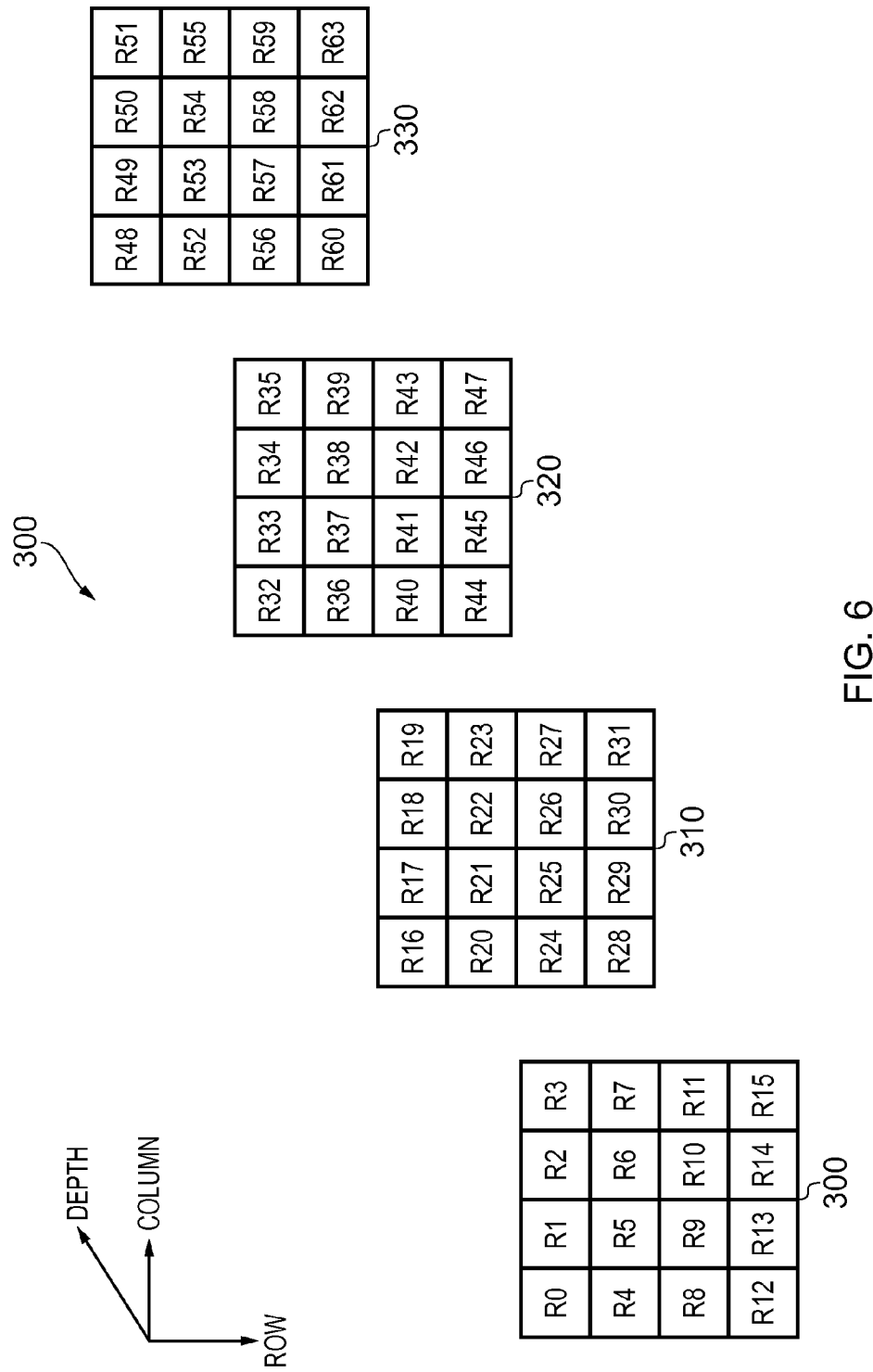
FIG. 6 illustrates how the set of registers may be logically arranged as a three dimensional matrix in accordance with one embodiment.

FIG. 6 schematically illustrates an embodiment where the set of registers are arranged as a three dimensional (3D) matrix of registers. In this example, it is assumed that there are 64 registers arranged into a 4×4×4 matrix. As a result, the 3D matrix 300 contains the four planes 300, 310, 320, 330 of registers in the depth dimension, and FIG. 6 illustrates one specific way in which the registers can be arranged within that 3D space. It will be appreciated that the registers can however be arranged differently dependent on implementation.

Figure 7:
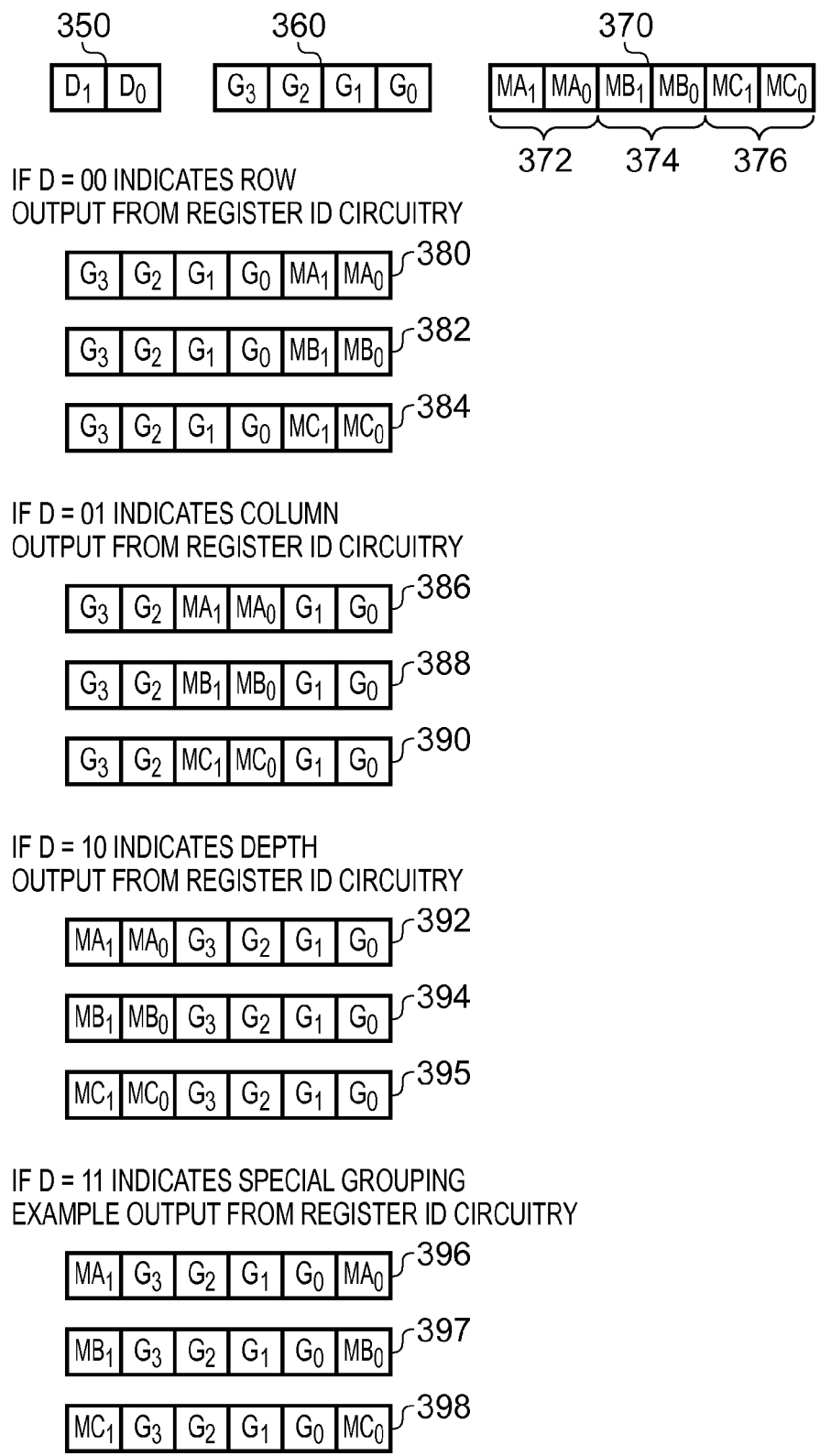
FIG. 7 illustrates how the contents of the register encoding space of an instruction are used to generate register access control signals for each register to be accessed, when the set of registers are logically arranged as a three dimensional matrix in accordance with one embodiment.

FIG. 7 illustrates how the register encoding space 120 is used to encode registers within the 3D matrix. In this example, the group type field 130 comprises two bits 350 identifying the dimension through the 3D matrix to be used, in one embodiment these bits being used to identify either a row, a column or a depth vector. Four group bits 360 are then used to identify which group within the dimension is being used. As will be appreciated from FIG. 6, four bits are required, since in any particular dimension there are 16 possible groups. The member identifying data then takes the same form as discussed earlier with reference to FIG. 5, and accordingly there are three items 372, 274, 376 of member identifying data 370, each item being two bits in size.

As shown in FIG. 7, if the dimension bits 350 indicate that a group within a row is being selected, then the four group bits form the most significant four bits of the 6 bit register access control signal used to uniquely identify a particular register within the 64 registers of the register set. The least significant two bits are then formed from each item of member identifying data, giving rise to the three register access control signals 380, 382, 384 shown in FIG. 7.

If however the dimension bits 350 indicate that a column has been selected, then the four group bits are used to form the least significant two bits and the most significant two bits of the register access control signals, with the middle two bits being formed from the items of member identifying data, in order to give rise to the register access control signals 386, 388, 390.

If instead the dimension bits 350 indicate a depth vector, then the four group bits are used to form the least significant four bits of the register access control signal, with each item of member identifying data then forming the upper two bits, thus giving rise to the three register access control signals 392, 394, 395 illustrated in FIG. 7.

It will be appreciated that the two dimension bits 350 also allow a fourth encoding, and how that fourth encoding is used can be chosen dependent on implementation. As shown in FIG. 7, one example is to use the four group bits to form the middle four bits of the register access control signals, with each item of member identifying data then forming both the least significant bit and the most significant bit, giving rise to the three register access control signals 396, 397, 398 shown in FIG. 7.

As will be apparent from FIG. 7, a total of 12 bits are required within the register encoding space 120 to encode the three registers, compared with the 18 bits that would be required if those registers had been directly encoded within the register encoding space.

Whilst in FIGS. 5 and 7 specific values of the dimension bits have been associated with specific dimensions, it will be appreciated that these are purely for the purposes of illustration, and how the bit values of the dimension bits are used can be changed dependent on implementation.

Figure 8:
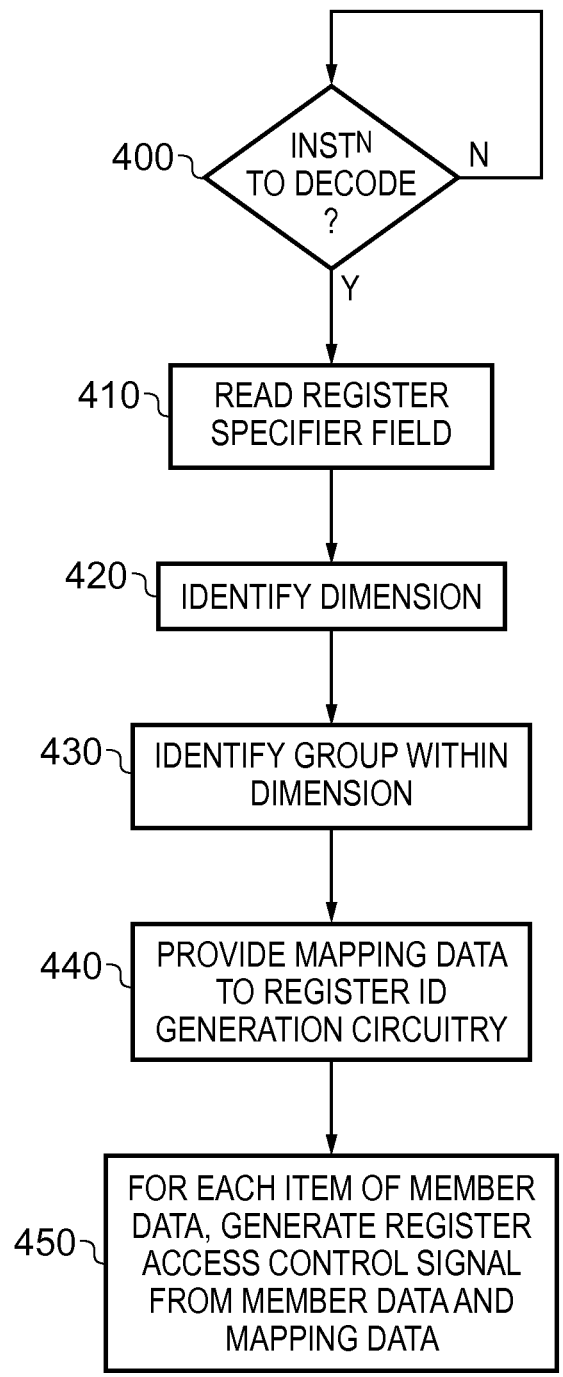
FIG. 8 is a flow diagram illustrating the process performed when decoding an instruction in order to generate the required register access control signals, in accordance with one embodiment.

FIG. 8 is a flow diagram illustrating the register decoding operation performed by the decoding circuitry 20 in accordance with one embodiment. At step 400, it is determined whether there is an instruction to decode. If so, the process proceeds to step 410 where the register specifier field is read, whereafter the dimension bit(s) are identified at step 420 and the group bits are identified at step 430 in order to identify the group within the particular specified dimension.

At step 440, the mapping circuitry 155 then generates mapping data from the group data and the identified dimension and provides that mapping data to the register access control signal generation circuitry. Thereafter, at step 450, for each item of member data, the register access control signal generation circuitry 160 generates a corresponding register access control signal using both the member data and the mapping data.

Figure 9:
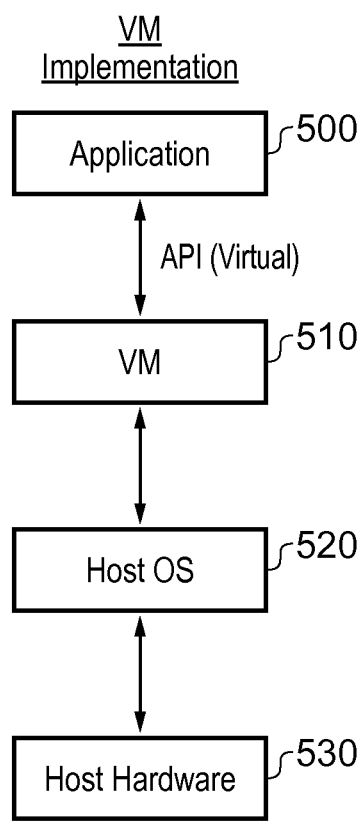
FIG. 9 is a diagram schematically illustrating a virtual machine implementation that may be used in one embodiment.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 typically running a host operating system 520 supporting a virtual machine program 510. Often, large powerful processors are required to provide virtual machine implementations which execute at a reasonable speed, but such an approach may be justified in certain circumstances, such as when there is a desire to run code native to another processor for compatibility or re-use reasons. The virtual machine program 510 is capable of executing an application program (or operating system) 500 to give the same results as would be given by execution of the program by such a real hardware device. Thus, the program instructions that include the particular formats of register specifier field discussed in the above described embodiments may be executed from within the application program 500 using the virtual machine program 510.

From the above described embodiments, it will be seen that those embodiments provide a particularly efficient mechanism for encoding registers within the register encoding space of an instruction. All of the registers within the register set are architecturally visible, plus providing a great deal of flexibility as to how the registers are used. In particular, on an instruction-by-instruction basis, individual groups of registers within the register set can be specified for use by that instruction, providing a great deal of flexibility as to how the registers are used, whilst giving rise to significant bit space reduction requirements for the encoding of registers within the instructions.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   processing circuitry configured to perform processing operations;
   a set of registers configured to store operands for access by the processing circuitry during performance of said processing operations;
   instruction decoder circuitry coupled to said processing circuitry and responsive to program instructions to generate control signals for the processing circuitry, said control signals including register access control signals identifying for each program instruction which registers in the set of registers are to be accessed by the processing circuitry when performing the processing operation specified by that program instruction;
   the set of registers being logically arranged as a plurality of register groups, with each register in the set of registers being a member of more than one of said register groups, and with each program instruction constrained to specify registers within one of the register groups;
   each program instruction including a register specifier field, and said instruction decoder circuitry being responsive to each program instruction:
   (i) to determine, from group identifying data within the register specifier field, mapping data indicative of a selected register group of said plurality of register groups;
   (ii) to determine, from member identifying data within the register specifier field, one or more selected members of said selected register group, the member identifying data providing for each selected member a corresponding item of member identifying data; and (iii) for each selected member determined from the member identifying data, to employ the mapping data in combination with the corresponding item of member identifying data to generate a corresponding register access control signal identifying the register corresponding to that selected member.

2. A data processing apparatus as claimed in claim 1, wherein the instruction decoder circuitry is configured:
  to determine, in dependence on the group identifying data, the mapping data indicative of the selected register group; and
  to generate, for each selected member determined from the member identifying data, the corresponding register access control signal identifying the register corresponding to that selected member, for each selected member the instruction decoder circuitry being configured to apply the mapping data to the corresponding item of member identifying data in order to generate the corresponding register access control signal.

3. A data processing apparatus as claimed in claim 2, wherein:
  the group identifying data comprises M group bits and a group type indicator, where M is a positive integer;
  each item of member identifying data comprises N bits, where N is a positive integer;
  each register access control signal comprises M+N bits; and
  the mapping data identifies the M group bits and the location that those M group bits are to occupy within the bit space of the register access control signal.

4. A data processing apparatus as claimed in claim 1, wherein:
  the set of registers are logically arranged as a multi-dimensional matrix of registers; and
  each register group contains as members those registers located along an associated path within the multi-dimensional matrix.

5. A data processing apparatus as claimed in claim 4, wherein each register group contains as members all registers located along the associated path.

6. A data processing apparatus as claimed in claim 4, wherein the associated path comprises a vector through the multi-dimensional matrix.

7. A data processing apparatus as claimed in claim 4, wherein the multi-dimensional matrix is a two-dimensional (2D) matrix comprising a plurality of rows and a plurality of columns, and the group identifying data identifies as the selected register group a register group containing as members those registers located along one row or one column of the 2D matrix.

8. A data processing apparatus as claimed in claim 4, wherein the multi-dimensional matrix is a three-dimensional (3D) matrix comprising a plurality of rows, a plurality of columns and a plurality of depth vectors, and the group identifying data identifies as the selected register group a register group containing as members those registers located along one row, one column or one depth vector of the 3D matrix.

9. A data processing apparatus as claimed in claim 8, wherein the group identifying data identifies as the selected register group a register group containing as members those registers located along one row, one column, one depth vector or one other group path from a predetermined set of other group paths within the 3D matrix.

10. A data processing apparatus as claimed in claim 9, wherein said predetermined set of other group paths comprises a plurality of diagonal vectors through the 3D matrix.

11. A method of operating an instruction decoder to decode program instructions in order to generate control signals for processing circuitry of a data processing apparatus, the processing circuitry performing processing operations and having access to a set of registers storing operands for access by the processing circuitry during performance of said processing operations, said control signals including register access control signals identifying for each program instruction which registers in the set of registers are to be accessed by the processing circuitry when performing the processing operation specified by that program instruction, the set of registers being logically arranged as a plurality of register groups, with each register in the set of registers being a member of more than one of said register groups, and with each program instruction constrained to specify registers within one of the register groups, and the method comprising, in response to each program instruction:

(i) determining, from group identifying data within a register specifier field of the program instruction, mapping data indicative of a selected register group of said plurality of register groups;

(ii) determining, from member identifying data within the register specifier field, one or more selected members of said selected register group, the member identifying data providing for each selected member a corresponding item of member identifying data; and (iii) for each selected member determined from the member identifying data, employing the mapping data in combination with the corresponding item of member identifying data to generate a corresponding register access control signal identifying the register corresponding to that selected member.

12. A non-transitory computer program product storing a computer program for controlling a computer to provide a virtual machine execution environment for program instructions corresponding to a data processing apparatus as claimed in claim 1.

* * * * *